United States Patent [19]
Korpi

[11] Patent Number: 6,055,937
[45] Date of Patent: May 2, 2000

[54] COVER ASSEMBLY FOR PET CAGES

[76] Inventor: Susan Korpi, 1250 Riverbed St., Suite 200, Cleveland, Ohio 44113

[21] Appl. No.: 09/141,967

[22] Filed: Aug. 28, 1998

Related U.S. Application Data

[60] Provisional application No. 60/058,012, Aug. 28, 1997.

[51] Int. Cl.[7] .............................. A01K 1/03; A01K 31/06
[52] U.S. Cl. ........................................... 119/452; 119/470
[58] Field of Search .................................. 119/453, 452, 119/484, 470, 469, 496, 165, 497, 498; 135/97, 95, 117, 93, 908, 137, 913; 224/576, 582, 583; 52/2.18, 2.23, 2.24; 47/26, 28.1, 45, 47

[56] References Cited

U.S. PATENT DOCUMENTS

| | | | |
|---|---|---|---|
| 53,334 | 3/1866 | Puffer | 135/137 |
| 84,381 | 11/1868 | Seaman | 135/137 |
| 654,972 | 7/1900 | Haack | 135/157 |
| 674,920 | 5/1901 | Jones | 135/137 |
| 694,232 | 2/1902 | Babbitt | 278/1 |
| 720,344 | 2/1903 | Hagedorn | 135/160 |
| 837,802 | 12/1906 | Dalton | 135/160 |
| 953,965 | 4/1910 | Moffitt | 135/137 |
| 1,147,414 | 7/1915 | Lera | 135/90 |
| 1,177,224 | 3/1916 | Bean | 454/197 |
| 1,219,905 | 3/1917 | Barringer | 135/96 |
| 1,412,302 | 4/1922 | Wittmann | 135/114 |
| 1,433,457 | 10/1922 | Hunter | 5/113 |
| 1,699,094 | 1/1929 | Chadirjian et al. | 135/159 |
| 1,925,815 | 9/1933 | Nicolson | 135/97 |
| 1,960,001 | 5/1934 | Davies | 47/26 |
| 2,002,925 | 5/1935 | Robison | 119/470 |
| 2,153,081 | 4/1939 | Goodale | 135/96 |
| 2,694,403 | 11/1954 | Hudson | 135/90 |
| 2,788,791 | 4/1957 | Pospisil et al. | 135/88.07 |
| 2,840,093 | 6/1958 | Matthews | 135/91 |
| 3,515,426 | 6/1970 | Gerger | 135/88.16 |
| 4,077,418 | 3/1978 | Cohen | 135/95 |

(List continued on next page.)

FOREIGN PATENT DOCUMENTS

| | | |
|---|---|---|
| 000449162A2 | 3/1991 | European Pat. Off. . |
| 408308417 | 11/1996 | Japan . |
| 410323139 | 12/1998 | Japan . |

OTHER PUBLICATIONS

Copy of Advertisement from Drs. Foster & Smith Catalog—Oct. 1988.
Copy of Advertisements from Companion Pet™ catalog—Summer 1993.

Primary Examiner—Michael J. Carone
Assistant Examiner—Fredrick T. French, III
Attorney, Agent, or Firm—Emerson & Associates; Roger D. Emerson; Daniel A. Thomson

[57] ABSTRACT

A cover assembly for use with an associated pet cage having a roof and four sides is provided. The cover assembly includes a gable shaped adapter and a cover for covering both the adapter and the pet cage. The cover has four walls for covering the four sides of the pet cage and a top for covering the roof of the pet cage. At least two of the walls are made of flexible material such as canvas. Preferably, two of the walls have openings for ventilation purposes. The top is also gable shaped to cover the support member of the adapter. Adjustable fasteners, such as zippers, are provided to fasten the four walls of the cover to each other. A method of covering a pet cage is also provided. The method includes the steps of connecting the adapter to the roof of the pet cage, placing a cover over the adapter and the pet cage, adjusting one of the walls into a raised condition and, securing the first wall into the raised condition.

12 Claims, 2 Drawing Sheets

U.S. PATENT DOCUMENTS

| | | | |
|---|---|---|---|
| 4,098,536 | 7/1978 | Mills | 296/77.1 |
| 4,263,925 | 4/1981 | Arganbright | 135/137 |
| 4,319,545 | 3/1982 | Sou | 119/17 |
| 4,743,215 | 5/1988 | Emmons | 446/478 |
| 4,930,445 | 6/1990 | Chestnut | 119/19 |
| 5,018,778 | 5/1991 | Goble | 296/159 |
| 5,099,866 | 3/1992 | Solis et al. | 135/105 |
| 5,113,793 | 5/1992 | Leader et al. | 119/19 |
| 5,116,255 | 5/1992 | Keeling | 119/452 |
| 5,277,148 | 1/1994 | Rossignol et al. | 119/452 |
| 5,335,618 | 8/1994 | Zarola | 119/452 |
| 5,439,018 | 8/1995 | Tsai | 135/143 |
| 5,449,014 | 9/1995 | Yan-Ho | 135/95 |
| 5,465,686 | 11/1995 | Monetti et al. | 119/168 |
| 5,485,805 | 1/1996 | Meissner | 119/17 |
| 5,638,850 | 6/1997 | Hazinski et al. | 135/120.1 |
| 5,718,190 | 2/1998 | Tinker | 119/771 |
| 5,819,474 | 10/1998 | Strom | 52/4 |
| 5,862,548 | 1/1999 | Gerhart | 5/93.1 |
| 5,937,883 | 8/1999 | Camara | 135/87 |

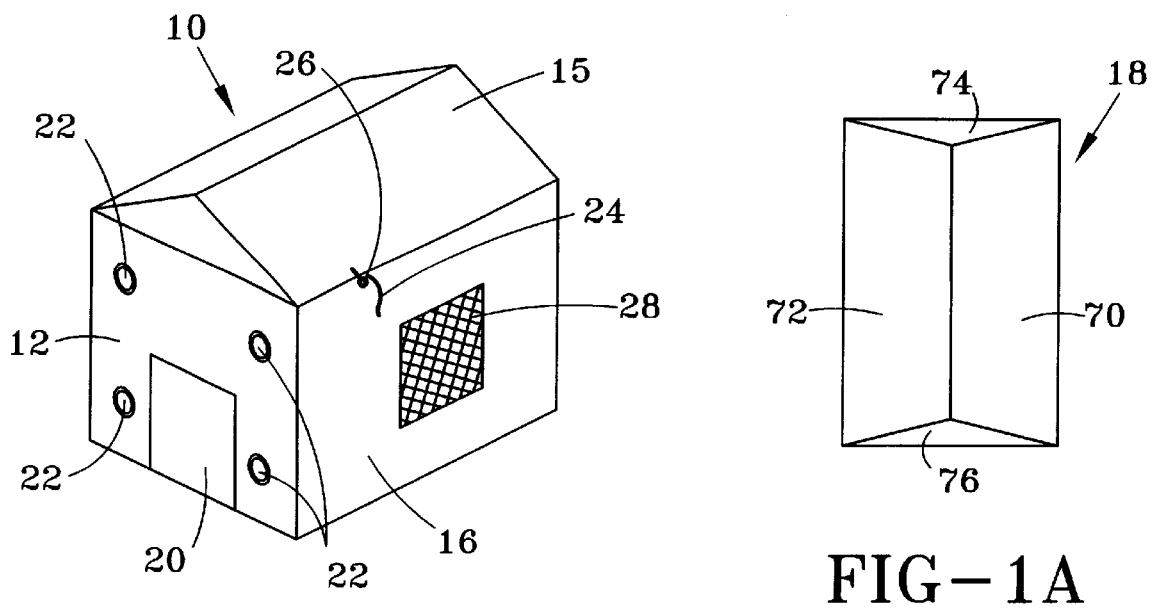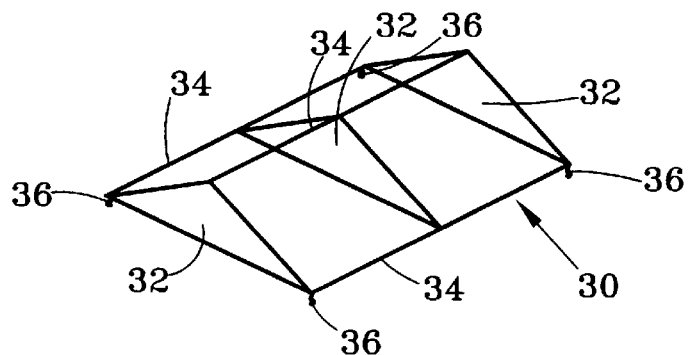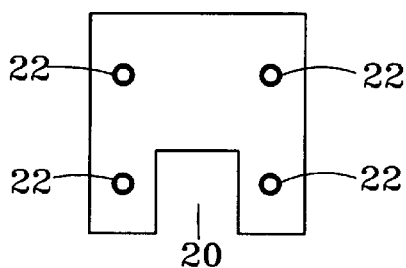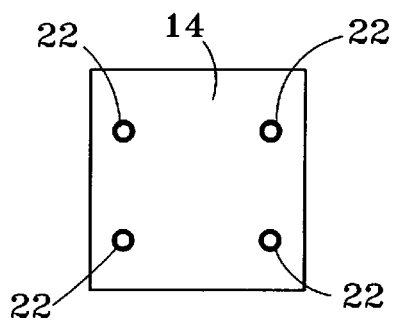

6,055,937

COVER ASSEMBLY FOR PET CAGES

This application claims priority to a U.S. Provisional patent application Ser. No. 60/058,012, filed on Aug. 28, 1997.

BACKGROUND OF THE INVENTION

I. Field of the Invention

This invention pertains to the art of methods and apparatuses for pet cages and more particularly to methods and apparatuses for covering pet cages.

II. Description of the Related Art

Covers for pet cages are well known in the art. One known type of pet cover is described in U.S. Pat. No. 5,485,805. Meissner discloses a pet cover formed of hard plastic that is placed over a pet cage. This cover is believed to be effective for its intended use. However, this type of pet cover has drawbacks. One drawback is that the hard plastic walls are not flexible and cannot be adjusted off of the sides of the pet cage. Another drawback, at least for some, is that the top of the pet cover is flat giving the pet cage a "box-like" shape.

Another type of pet cover is described in U.S. Pat. No. 5,113,793. Leader, et al disclose a canvas cover that is placed over a mobile pet cage. This cover is believed to be effective for its intended use but it also has drawbacks. One drawback is that the walls of the cover are not adjustably fastened to each other. For this reason, any attempt at raising one of the walls away from the pet cage forces the neighboring walls to be at least partially raised as well. Another drawback, as noted above, is that for some flat-topped pet covers are undesirably shaped.

The present invention contemplates a new and improved pet cover assembly having a gable-shaped adapter and a cover with flexible walls adjustably fastened to each other. Thus, this invention is simple in design, effective in use, and overcomes the foregoing difficulties and others while providing better and more advantageous overall results.

SUMMARY OF THE INVENTION

In accordance with one aspect of the present invention a new and improved cover for a pet cage includes a top, a front wall, a back wall, and two side walls. The top is connected to the side walls, the front wall, and the back wall, the front wall having an opening. All of the walls cover the corresponding sides of the pet cage. Also, a zipper attaches one of the walls to the other walls, particularly the side walls to the front and back walls. The pet cages can be of any type common in the industry.

In accordance with another aspect of the invention an adapter converts a flat-roofed pet cage into a gable-roofed pet cage. The adapter has a support member that holds the cover over the cage, which creates the gabled roof. The support member is connected to the flat-roofed cage by a series of hinged joints.

In accordance with yet another aspect of the invention the adapter is connected to the roof of the pet cage by a plurality of hinged joints, then the cover is placed over the adapter and the pet cage. The first wall of the cover is then adjusted into a raised condition and secured to the first wall of the cover.

According to another aspect of the invention the side walls have windows that are made of mesh and the side walls can be rolled up and tied to the top. The side wall is tied to the top by a leather strap and a brass hook-and-eye-fastener.

According to yet another aspect of the invention, the top is gable-shaped, allowing it to fit securely on the adapter.

According to another aspect of the invention the front wall and back wall have grommets allowing ventilation through the pet cage.

In accordance with still another aspect of the invention the entire cover is made of moisture and fire resistant canvas, particularly 10 ounce wax cloth.

One advantage of the present invention is that soft cover wall material provides flexibility in the cover. The soft cover material also permits a moisture and fire resistant fabric to be used.

Another advantage of the current invention is that the cover selectively covers the entire pet cage, when necessary.

A further advantage is the moveable side flaps which allow any amount of light that is desired by the owner.

Still another advantage is the mesh windows that allow ventilation through the cage when the cage is fully secured and on the cage.

Yet another advantage are the grommets on the front and back walls which allow ventilation through the front and back of the pet cage.

A further advantage is that the adapter permits a flat-roofed pet cage to be converted into a gable-roofed pet cage. Thus, the cage looks more like a house than any known pet covers.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein:

FIG. 1 is a perspective view of the pet cover showing the top, front wall, and one side wall of the cover;

FIG. 1A is a top view of the pet cover;

FIG. 2 is a perspective view of the adapter, showing the wooden slats and cross-beams;

FIG. 3 is a front view of the front wall including the opening;

FIG. 4 is a back view of the back wall;

DESCRIPTION OF THE PREFERRED EMBODIMENT

Figure 6:
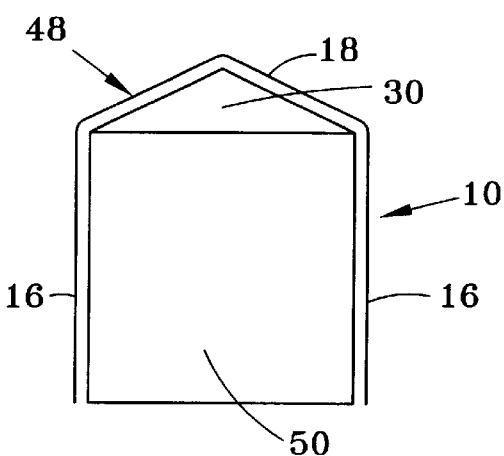
FIG. 6 is a cross-sectional view of the cover assembly, showing the cover and adapter covering the pet cage; and, FIG. 7 is a perspective view of a typical pet cage.
Figure 7:
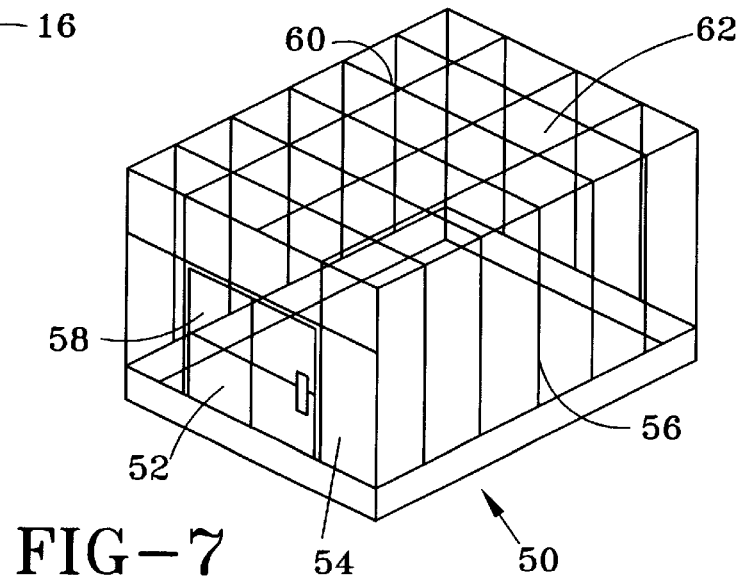

Referring now to the drawings, which are for purposes of illustrating a preferred embodiment of the invention only, and not for purposes of limiting the same, FIG. 6 shows the inventive cover assembly 48 that includes a cover 10 and an adapter 30 for use with an associated pet cage 50. The pet cage 50 can be of any type commonly known in the art. As shown in FIG. 7, the pet cage 50, as is typical, may have a roof 60, a front side 54, a back side 62 and first and second middle sides 56, 58. The front side 54 may have a door 52.

With reference now to FIG. 1, the cover 10 includes a top 18, a front wall 12, and at least one side wall 16. FIG. 1 shows two side walls 16 although this invention would work equally well with just a single side wall 16 thereby allowing the pet cover 10 to be slipped on from the back. The top 18 is shown in a triangular pyramid configuration, that is also known as gable-shaped. The top 18 could obviously be made in any particular shape that is desired. FIG. 1 also shows an opening 20 in the front wall 12. The design shown is for ease of entry for any pet. The opening 20 corresponds with the door 52 in the pet cage 50. The opening 20 allows the door 52 to be opened without removing the cover 10. The opening 20 could be shaped in any way desired. Also the back wall 14 could have an opening if desired. FIG. 1 also shows four grommets 22 in each of the front and back walls 12, 14. The number of grommets 22 could be changed upon necessity. FIG. 1 also shows a leather strap 24 and a hook-and-eye fastener 26. These are for use when the side wall 16 is rolled up. They secure the side wall 16 to the top 18. The particular means of fastening does not need to be a leather strap and a hook-and-eye fastener. Any means to secure the side wall 16 to the top 18 could be used. FIG. 1 also shows a mesh window 28. The window 28 allows ventilation through the pet cage 50 when the cover 10 is securely fastened over the pet cage 50. The cover 10 can have as many windows 28 as desired, and even the entire side wall 16 can be made out of mesh.

FIG. 1A shows the top 18 of the pet cover 10. The top 18 is preferably gable-shaped, having first and second portions 70, 72, and front and back portions 74, 76. The first, second, front, and back portions 70, 72, 74, 76 cover the corresponding adapter 30. The first and second portions 70, 72 are fixedly connected to the side walls 16, 16. The first and second portions 70, 72 extend upward, from the side walls 16, 16, at an angle until the first and second portions 70, 72 meet and are connected to each other. The front and back portions 74, 76 are fixedly connected to the first and second portions 70, 72, as well as the front and back walls 12, 14. The top 18 of the cover 10 is placed over the adapter 30, which is connected to the pet cage 50.

FIG. 2 shows the adapter 30 that converts the flat-roofed pet cage into a gable-roofed pet cage. It is shown in FIG. 2 as triangular shaped, but could be designed in any shape that is desired. FIG. 2 shows wooden slats 32 that hold up the cover 10; any number of slats 32 could be used. The wooden slats 32 could be any shape that is desired as well. FIG. 2 also shows cross beams 34 which hold up the wooden slats 32. This is done for support of cover 10. One cross beam 34 is connected to each corner of the wooden slats 32. The cross beams 34 do not need to be in this particular configuration. FIG. 2 also shows hinged joints 36. These are used to hold the pet cover 10 on to the pet cage 50. The hinged joints 36 are attached underneath the adapter 30 it each corner. The hinged joints 36 connect around the roof 60 of the pet cage 50, securing the adapter 30 to the pet cage 50. Any other means of securing the adapter 30 to the pet cage 50 would be adequate as well.

Figure 5:
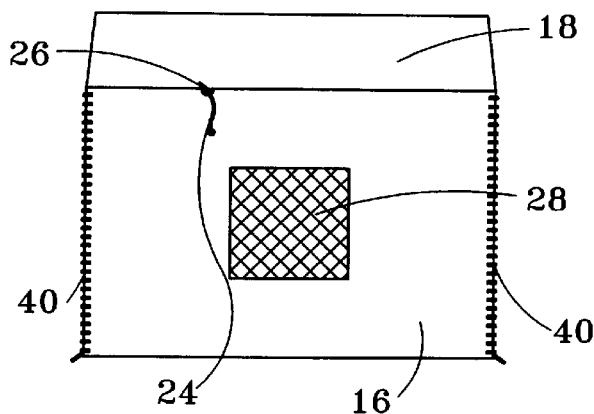
FIG. 5 is a perspective view of the cover including the zipper and fastening means for the side walls.

FIG. 5 shows zippers 40 attached to the cover 10. These zippers 40 are for adjustably fastening the side wall 16 to the front and back walls 12, 14. The side wall 16 could be attached to the front and back walls 12, 14 with any adjustably fastening means chosen with sound Engineering judgment. The side wall 16 is selectively detached from the front and back walls 12, 14 by the zippers 40, and can then be rolled up and secured with the leather strap 24 tied through the hook-and-eye fastener 26, securing the side wall 16 to the top 18.

Figure 5A:
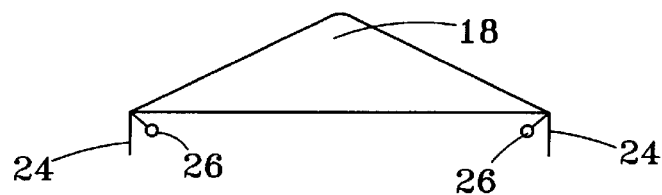
FIG. 5A is a front view of the top of the cover, showing the leather strap and hook-and-eye fastener.

FIG. 5A shows that the leather strap 24 is fixedly connected to the top 18 and hangs downward from the top 18 when not in use. The hook-and-eye fastener 26 is also fixedly connected to the inside of the top 18, directly opposite the leather strap 24. When the side wall 16 is rolled up the leather strap 24 is wrapped around the rolled up, side wall 16 and connected to the hook-and-eye fastener 26 on the inside of the top 18. The cover 10 slides down over the pet cage 50 and is designed in several different sizes to fit the standard sizes of pet cages in the industry.

With reference now to FIGS. 1, 2, 6, and 7, a method of covering the pet cage 50 with the cover assembly 48 of this invention will now be disclosed. First, the adapter 30 is connected to the roof 60 of the pet cage 50, then the cover 10 is placed over the adapter 30 and the pet cage 50. The adapter 30 is connected to the roof 60 by means of hinged joints 36. The hinged joints 36 are attached to the bottom of the adapter 30 and clasp onto the roof 60. When the cover assembly 48 is connected to the pet cage 50, the side wall 16 may be rolled up from covering the first side 56. When the side wall 16 is rolled up it can be fastened to the top 18 by a leather strap 24 and a hook-and-eye fastener 26. The leather strap 24 wraps around the rolled side wall 16 and connects to the hook-and-eye fastener 26, thereby securing the side wall 16.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A cover for use with an associated pet cage having a roof and at least first, second, third and fourth sides, the cover comprising:
   A) a first wall for use in covering the first side of the associated pet cage, the first wall having a first window formed of mesh;
   B) a second wall for use in covering the second side of the associated pet cage;
   C) third and fourth walls for use in covering the third and fourth sides of the associated pet cage respectively, a top for use in covering the roof of the associated pet cage, the top being operatively connected to the first, second, third and fourth walls;
   D) adjustable fastening means for selectively adjustably fastening the first wall to the second wall, the first wall to the fourth wall, the second wall to the third wall and the third wall to the fourth wall;
   E) the adjustable fastening means permitting at least the first wall to be adjusted into a raised position uncovering the first side of the associated pet cage.

2. The cover of claim 1 wherein the adjustable fastening means comprises a plurality of zippers that extend from the top and between the first, second, third and fourth walls.

3. The cover of claim 2 further comprising:
   securing means for securing the first wall to the raised condition.

4. A cover assembly for use with an associated pet cage having a roof, a front side, a back side and first and second middle sides, the front side having a door, the cover assembly comprising:
   A) an adapter that includes,
      1) a support member that forms a gable-shaped roof for the associated pet cage;

2) connecting means for connecting the support member to the roof of the associated pet cage, the connecting means including a plurality of hinged joints; and, B) a cover that includes,
1) first, second, third and fourth walls for use in selectively covering the front, back, and first and second middle sides respectively of the associated pet cage, the first wall having a first opening for selectively receiving the door in the front side, the second wall having multiple grommets, the third and fourth walls being formed of flexible material;
2) a top for use in covering the roof of the associated pet cage, the top being operatively connected to the first, second, third and fourth walls, the top being gable shaped to cover the support member of the adapter;
3) adjustable fastening means for use in selectively adjustably fastening the first wall to the third wall, the first wall to the fourth wall, the third wall to the second wall and the second wall to the fourth wall, the adjustable fastening means including four zippers that extend from the top and between the first, second, third and fourth walls, the adjustable fastening means permitting the third and fourth walls to be adjusted into to a raised condition uncovering the first and second middle sides of the associated pet cage; and,
4) securing means for securing the third and fourth walls in the raised condition, the securing means including
    a) a first strap and fastener for use in securing the third wall in the raised condition, the first fastener being fixedly connected to the associated pet cage; and,
    b) a second strap and fastener for use in securing the fourth wall in the raised condition, the second fastener being fixedly connected to the associated pet cage.

5. An adapter for use with an associated pet cage and an associated pet cover, the pet cage having a roof, the adapter comprising:

A) a support member for supporting the associated pet cover; and

B) connecting means for connecting the support member to the roof of the associated pet cage, the connecting means being defined by a plurality of hinged joints.

6. A method of covering a pet cage having a roof, the method comprising the steps of:

A) connecting a gable shaped adapter to the roof of the pet cage; and,

B) placing a cover over the adapter and the pet cage.

7. A method of covering a pet cage having a roof, the method comprising the steps of:

A) connecting an adapter to the roof of the pet cage using a plurality of hinged joints; and, B) placing a cover over the adapter and the pet cage.

8. A method of covering a pet cage having a roof, first and second sides and the cover having first and second walls for use in covering the first and second sides, the method comprising the steps of:

A) connecting a gable shaped adapter to the roof of the pet cage;

B) placing a cover over the adapter and the pet cage;

C) adjusting the first wall into a raised condition from covering the first side; and, D) securing the first wall into the raised condition.

9. An adapter for use with an associated pet cage and an associated pet cover, the pet cage having a roof, the adapter comprising:

A) a gable shaped support member for supporting the associated pet cover; and

B) connecting means for connecting the support member to the roof of the associated pet cage.

10. The adapter of claim 9 wherein the support member extends fully over the roof of the pet cage.

11. The adapter of claim 10 wherein the support member comprises:

a frame having a plurality of triangular slats.

12. A cover for use with an associated pet cage having a roof and at least first and second sides, the cover comprising:

A) a first wall for use in covering the first side of the associated pet cage, the first wall having a first window formed of mesh;

B) a second wall for use in covering the second side of the associated pet cage;

C) a top for use in covering the roof of the associated pet cage, the top being operatively connected to the first and second walls;

D) third and fourth walls for use in covering third and fourth sides of the pet cage respectively, the top being operatively connected to the third and fourth walls, the adjustable fastening means for selectively adjustably fastening the first wall to the fourth wall, the second wall to the third wall and the third wall to the fourth wall;

E) adjustable fastening means for selectively adjustably fastening the first wall to the second wall, the adjustable fastening means permitting the first wall to be adjusted into to a raised condition from covering the first side of the associated per cage, the adjustable fastening means being defined by a plurality of zippers that extend from the top and between the first, second, third and fourth walls; and, F) securing means for securing the first wall into the raised condition, the securing means being defined by a first strap and fastener.

* * * * *